Patented Feb. 11, 1941

2,231,788

UNITED STATES PATENT OFFICE 2,231,788

9-AROYL-10-PHENANTHROIC ACIDS

Roger Adams, Urbana, Ill., and Allene Jeanes, Washington, D. C., assignors to E. I. du Pont de Nemours & Company, Wilmington, Del., a corporation of Delaware No Drawing. Original application June 11, 1938, Serial No. 213,188. Divided and this application May 21, 1940, Serial No. 336,436

7 Claims. (Cl. 260—517)

This invention relates to compounds containing a phenanthrene nucleus and more particularly to the production of compounds from the alkali metal salts of trans-9,10-di-carboxy-9,10-di-hydro-phenanthrene.

This application is a division of our application Serial Number 213,188, filed June 11, 1938.

In United States Patent 2,027,000 of January 7, 1936, N. D. Scott describes the treatment of phenanthrene with sodium in di-methyl ether (Example IX, page 3) to form an addition compound and the treatment of that with carbon dioxide. He called the final reaction product "dihydrophenanthrene di-carboxy acids". Among the solvent or suspension media (in addition to di-methyl ether) listed by him as useful in this type of reaction is glycol di-methyl ether (page 1, column 2, line 36).

It has now been found that in the treatment of phenanthrene with sodium, ethylene glycol di-methyl ether has advantages over di-methyl ether and that the addition product formed under such conditions may be converted to a trans-9,10-di-carboxy-9,10-di-hydro-phenanthrene product by treatment with carbon dioxide. It has also been found that numerous phenanthrene derivatives may be synthesized from this last named product.

From the following description and specific examples, in which are disclosed certain embodiments of the invention as well as details of what is believed to be the best mode for carrying out the invention, it will be apparent how the foregoing objects and related ends are accomplished. The quantities are given in parts by weight throughout the application.

Example I

For the preparation of trans-9,10-di-carboxy-9,10-di-hydro-phenanthrene, 50 parts of phenanthrene were mixed with 220 parts of ethylene glycol di-methyl ether in a vessel provided with a mechanical stirrer (for agitation) and two top openings. The solution was cooled by surrounding the container with cracked ice and a current of dry nitrogen lead through the vessel to remove and prevent the access of air. Thin strips of sodium totalling in weight 17 parts were added. Even though care is taken to add oxide-free sodium, experience indicates that it is generally necessary to cut some of the pieces of sodium in the reaction mixture in order to get a perfectly clean surface to aid in starting the reaction. A dark green mossy precipitate formed at once on the freshly exposed surfaces, and then spread evenly on each piece of metal. The stirrer was then started. The pale green color which first appeared in the solution changed rapidly to a dense green, then dark green insoluble particles became apparent in increasing amounts. At this stage the nitrogen stream was replaced by one of dry carbon dioxide, which was passed over the surface of the reaction mixture. It was regulated to a slow stream of gas, care being taken to maintain an empirical optimum concentration of carbon dioxide in the vessel at all times. In a short time the mixture appeared brown due to suspended particles, but the solution was still green. At the end of 1 to 1½ hours the mixture had become thick with this very dark brown or black suspension, and yellow colored sodium salts gradually formed on the surface of the mixture. In 2½ hours the dark color had been replaced entirely by the yellow color of the insoluble sodium salts, and the mixture had become somewhat thinner. This marked the end of the reaction, which is represented in the equation:

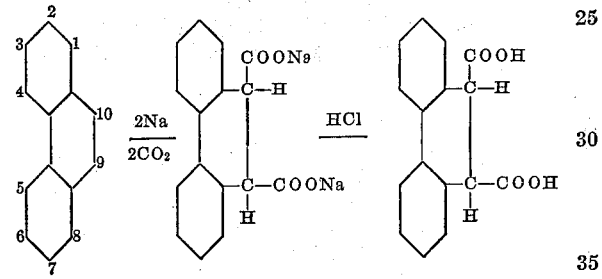

The mass of unused sodium which was coated with a jet black deposit was removed and the remaining thick solid product was poured and scraped from the reaction vessel. No appreciable amount of solvent was left, so the remaining traces were allowed to evaporate spontaneously. One hundred thirteen (113) parts of dry product were obtained. This was pulverized and extracted for 1 to 2 hours with 100 parts of water at room temperature. The water insoluble material was washed twice with a little water, and the washings added to the original filtrate. About 21 parts of water insoluble material were obtained. Dilute hydrochloric acid was added slowly with stirring to the brown colored aqueous solution. Carbon dioxide was liberated, and a tar formed before the solution was acid to litmus. With the exercise of sufficient care this tar can be precipitated and removed from the solution before any of the crystalline acids are deposited. The acidification was carried past a Congo red end point, and the cream colored acid completely precipitated. Twenty-four (24) parts of the dry product were obtained.

The final product was extracted twice with boiling chloroform, which dissolved the remaining tarry material and left the white insoluble trans -9,10 - di - carboxy-9,10-di - hydro-phenanthrene. The latter was crystallized from glacial acetic acid forming hard white rectangular crystals melting at 235°–242° C. with decomposition. The melting point varies somewhat, and is usually no sharper than that indicated. The product may also be crystallized satisfactorily from 75% ethanol. It is insoluble in chlorform, benzene, and petroleum ether. Analysis for carbon and hydrogen showed 71.80 and 4.57, respectively. The theoretical values are C, 71.64 and H, 4.47 for $C_{16}H_{12}O_4$.

The structure of this product was established by the fact that it was oxidized to 9-carboxy-phenanthrene by treatment with potassium ferricyanide and phenanthraquinone by oxidation with chromic acid.

*Example II*

The formation of trans-9,10-dicarbomethoxy-9,10-di-hydro-phenanthrene illustrates the ease with which an acid of Example I may be esterified.

The pure acid from Example I was esterified with absolute methanol and a few drops of concentrated sulfuric acid. The ester crystallized from the cold reaction mixture and was purified by recrystallization from methanol. It formed white shining plates in quantitative yield and melted at 128° C. The analysis showed C, 72.98 and H, 5.40, which are to be compared with the calculated values of C, 72.97 and H, 5.40 for $C_{18}H_{16}O_4$.

*Example III*

The preparation of 9,10-di-carboxy-9,10-di-hydro-phenanthrene anhydride, having the formula:

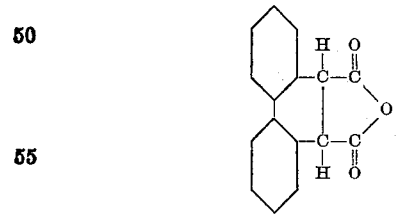

from the acid of Example I was accomplished by heating under reflux 5 parts of the pure product of Example I with 11 parts of acetic anhydride. After 2 hours the reaction mixture was allowed to cool slowly for several hours, and was then chilled with ice. One crystallization from acetic anhydride gave a pure product in the form of dull yellow rods melting at 193.5° C. in a yield of 4.22 parts. This color is believed to be due to the presence of traces of 9,10-di-carboxy-phenanthrene anhydride. Sublimation gave a colorless product having the same melting point. The calculated analysis for $C_{16}H_{10}O_3$ is C, 76.80 H, 4.00, and that found was C, 76.45 and H, 4.10.

*Example IV*

For the preparation of cis-9,10-di-carboxy-9,10-di-hydro-phenanthrene, pure 9,10-di-carboxy - 9,10 - di - hydro-phenanthrene anhydride (the product of Example III) was dissolved in 10% aqueous sodium hydroxide by occasionally stirring alternating with standing at room temperature for about 1 hour. The solution was orange colored containing some fine yellow precipitate which was dissolved when the solution was diluted to twice its volume with cold water. This precipitate was the sodium salt of cis-9,10-di-carboxy - 9,10 - di-hydro-phenanthrene. The free cis acid was obtained by freeing the diluted solution from a very small amount of orange-colored insoluble material whose nature has not yet been determined, and carefully acidifying with 3 N-hydrochloric acid. At first a fine white precipitate is formed, but this soon becomes yellow. The product fuses and loses water at 196° C. Continued heating caused the product to solidify and to melt completely at 232° C. without decomposition.

The cis acid, which may be represented by the formula:

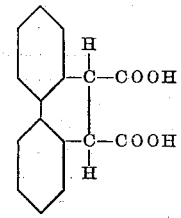

is more soluble in glacial acetic acid than the corresponding trans form. The cis acid is readily converted into the trans form by recrystallizing from hot glacial acetic acid. The cooling of a hot purified glacial acetic acid solution of the cis acid gave trans acid which melted at 235°–243° C. with vigorous decomposition. The yield is apparently quantitative since no other material is obtained from the solution.

The cis acid may also be converted to the trans acid by dissolving in cold 10% aqueous sodium hydroxide, purifying by filtration, and warming the orange-colored filtrate on a steam bath for about 15 minutes. As the warming continues the color gradually becomes yellow. When cooled such a solution remains free from precipitate. Acidification produces a slightly gummy white precipitate which does not become yellow. When dry this melts with vigorous decomposition at 240°–245° C. Esterification of this product with methanol gave a product melting at 128° C. like the product described in Example II. No trace of the corresponding cis ester is found.

The irridescent plate-like crystals of the trans ester obtained from cooling alcoholic solutions thereof are quite easily distinguishable from the yellowish needles of the corresponding cis ester.

*Example V*

The cis acid may be esterified in the usual way by treatment with methanol and a few drops of concentrated sulfuric acid. A small amount of yellow insoluble 9,10-di-carboxy-phenanthrene anhydride shows up in the methanol solution, and if desired, may be removed by filtration. By allowing the alcoholic filtrate to cool and concentrate slowly, the cis ester is formed in the form of yellowish needles. Recrystallization from methanol gives pale yellow needles melting at 119° C. The esterification seems to be quantitative.

Example VI

The formation of 9,10-di-carboxy-phenanthrene anhydride having the formula:

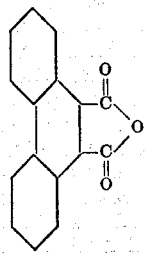

was carried out by slowly stirring 1.3 parts of chromic anhydride in 11 parts of acetic anhydride into a solution of 2.5 parts of 9,10-di-hydro-phenanthrene anhydride in 11 parts of boiling acetic anhydride which had been cooled to 80° C. The reaction mixture was kept on a steam bath. An exothermic reaction occurred, and a yellow precipitate began to settle out. After 15 minutes on the steam bath it was allowed to cool to room temperature and stand for 4 hours, after which it was cooled on ice. An orange-colored solid was isolated, dried, and purified by crystallization from 166 parts of acetic anhydride. A yield of 2.3 parts of yellow rod-shaped crystals melting at 322° C. were obtained. This product may also be crystallized from dioxane. It is only very slightly soluble in the other common organic solvents. Analysis showed C, 77.39 and H, 3.07. The calculated values for $C_{16}H_8O_3$ are C, 77.44 and H, 3.21.

This anhydride is extremely stable and can be dissolved completely only by boiling in hot alkali. If a solution of the anhydride in warm alkali is cooled and carefully acidified with dilute hydrochloric acid, a white precipitate presumably of the acid separates, but this turns yellow upon filtering, and by the time it is dry it is completely yellow and is essentially pure anhydride.

Example VII

The anhydride of Example VI was converted to 9,10-dicarbomethoxy-phenanthrene by heating a mixture of:

| | Parts |
|---|---|
| 9,10-di-carboxy-phenanthrene anhydride | .5 |
| Methanol | 4 |
| 35% aqueous potassium hydroxide | 13.5 | on a steam bath for 1 hour, and gradually stirring in 10.7 parts of dimethyl sulfate. Dilute methyl alcoholic potassium hydroxide was added from time to time in order to keep the solution basic during the dimethyl sulfate addition. Upon cooling gradually, yellow crystals separated. These were purified from 90% methanol, giving pale yellow rectangular plates melting at 131° C. The analyses for $C_{18}H_{14}O_4$ were calculated as C, 73.49 and H, 4.76. The values found were C, 73.39 and H, 5.00.

Example VIII

The formation of 9-benzoyl-10-phenanthroic acid, having the formula:

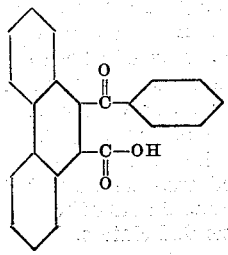

from the anhydride of Example VI was carried out by adding to a well cooled solution of 10 parts of 9,10-di-carboxy-phenanthrene anhydride in 36 parts of dry benzene, 11 parts of powdered anhydrous aluminum chloride with stirring. The reaction mixture was warmed during 1 hour until the temperature was 90° C. The color changed from bright orange to brown, and then to green. After 3 hours at this temperature the mixture was cooled and ice and 16 parts concentrated hydrochloric acid added. After the removal of the benzene by steam distillation, the residual material was dissolved in hot aqueous sodium carbonate. The solution was filtered from about 2.5 parts of unreacted anhydride and then acidified. The precipitant formed upon acidification was dried and purified by two crystallizations from a large volume of boiling chloroform. The product thus formed contains chloroform of crystallization. On drying in vacuo at 100° C. a white powder melting at 232° C. was obtained. The yield was 9 parts. The calculated analysis for $C_{22}H_{14}O_3$ was C, 80.79, H, 4.28. Analysis of the product gave C, 80.70 and H, 4.30.

Example IX

The formation of 9,(p)-toluyl-10-phenanthroic acid, having the formula:

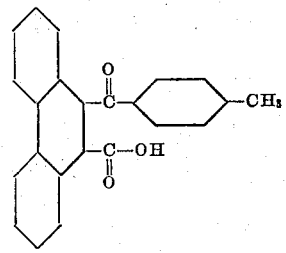

from the anhydride of Example VI was carried out by adding to a well cooled solution of 1.25 parts of 9,10-di-carboxy-phenanthrene anhydride in 6.1 parts dry toluene, 1.5 parts of powdered anhydrous aluminum chloride, with stirring. The reaction was carried out in the manner described in Example VIII. The total reaction time was 2¼ hours. The solid residue after steam distillation of the toluene was extracted with hot 5% sodium carbonate solution. The insoluble material was removed and the solution acidified. A precipitate which formed upon acidification was purified by crystallization from toluene. It was obtained as light buff-colored crystals fusing slightly at 231° C. and melting at 236° C. The substance gave a deep green color with concentrated sulfuric acid. The calculated analysis for $C_{23}H_{16}O_3$ is C, 81.17 and H, 4.70; that found was C, 81.20 and H, 4.70.

The sodium carbonate insoluble material was found to be insoluble in aqueous sodium hydroxide. It was purified by recrystallization from glacial acetic acid as white plates melting at 247° C. It gave no color with concentrated sulfuric acid and proved to be a phthalein. The calculated analysis for di-tolyl-phenanthphthalein ($C_{30}H_{22}O_2$) is C, 86.95 and H, 5.31. The product obtained gave upon analysis C, 87.07 and H, 5.53.

Example X

The formation of 9,(p)-chloro-benzoyl-10-phenanthroic acid from the anhydride of Example VI was carried out by adding 34 parts of chloro benzene (B. p. 132° C.) to 6.2 parts of 9,10-di-carboxy-phenanthrene anhydride in a suitable vessel, and with agitation 6.7 parts of pea size aluminium chloride were gradually introduced at 90° C. in the course of a half hour. The temperature was kept constant in an oil bath. The temperature of the agitated mass was gradually raised to 110° C. during 3½ hours. After cooling to 40° C. the reaction mass was poured into 200 parts of ice-cooled 5% hydrochloric acid and then treated with steam in a still until all excess chloro benzene had been removed. The Friedel-Crafts synthesis was carried out under a reflux condenser. The residue in the still was collected, pulverized, and digested with 300 parts of 5% sodium carbonate solution at 100° C. for several hours, after which the mass was allowed to cool to room temperature. The precipitate consisted of alkali insoluble material in admixture with the sodium salt of the desired product. The sodium salt of an acid low in chlorine remained in the alkaline solution. The precipitate was collected, extracted with hot water, and the extract (80 parts) acidified with hydrochloric acid. This caused precipitation of the desired product 9,(p)-chloro-benzoyl-10-phenanthroic acid. The crude product, of which 1.36 parts were obtained, melted at 205° C. After recrystallization from benzene, the new acid was obtained in a pure form. It melted at 254° C. The calculated chlorine content for the product, which has the formula ($C_{22}H_{13}O_3Cl$):

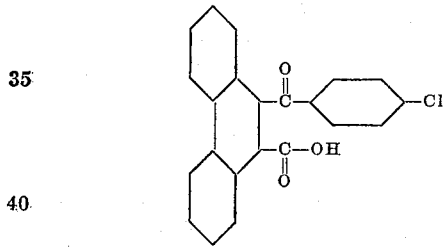

was 9.83. Analysis showed the product to have a chlorine content of 9.95.

*Example XI*

The formation of 1,2,3,4-di-benz-anthraquinone from the acid of Example VIII was carried out by immersing a thorough mixture of 9-benzoyl-10-phenanthroic acid and excess phosphorus pentoxide in a bath at 220° C., and thereafter raising the temperature to 260° C. in about 5 minutes' time. The mixture was pressed together during the heating. After cooling somewhat, hot water was added, and the solid removed and treated with dilute aqueous ammonia. The residue was extracted with 75% ethanol which dissolved the quinone. Some of the quinone separated on cooling, and the remainder was obtained by evaporation of part of the alcohol. The product, which has the formula:

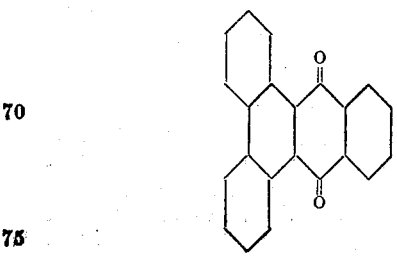

was purified from glacial acetic acid and found to have a melting point of 181°–183° C.

This product is described by Clar in Ber. vol. 62, p. 350, who gives its melting point as 179° C.

Ring-closure of substituted 9-benzoyl-10-phenanthroic acids leads to homologs of the product of this example. Substitution products of 1,2,3,4-di-benz-anthraquinone are obtained since the benzene residue (radical, group) is common to all such products. In this way 2-methyl-5,6,7,8-di-benz-anthraquinone and 2-chloro-5,6,7,8-di-benz-anthraquinone are obtained from the products of Examples IX and X (in which the substituents are on the benzo ring joined to the two keto groups). The corresponding 2,4-di-methyl-5,6,7,8-di-benz-anthraquinone is obtained from the 9-xyloyl-10-phenanthroic acid formed when the meta xylene replaces the benzene, toluene and chloro-benzene of Examples VIII, IX and X. In this connection 9-naphthoyl-10-phenanthroic acid and the like may be considered substituted 9-benzoyl-10-phenanthroic acids.

The conditions given in the individual examples do not represent the sole conditions for that particular reaction, as will be obvious to those skilled in the art. Neither do the reactants specified in the individual examples exhaust the number of compounds which may be reacted with the new phenanthrene derivatives and processes described.

In the esterification of the cis- and trans-9,10-di-carboxy-9,10-di-hydro-phenanthrene, other alcohols than methyl alcohol, for example, ethyl, isopropyl, secondary butyl and lauryl alcohols may be used. Other alkyl sulfates than dimethyl sulfate, for example, diethyl sulfate, may be employed. Such other esterification agents may also be employed in the esterification of 9,10-di-carboxy-phenanthrene anhydride.

Other anhydrization means than acetic anhydride may be used for the formation of 9,10-di-carboxy-9,10-di-hydro-phenanthrene anhydride from the free trans- and cis- acids and their salts.

Other oxidation means than chromic acid may be used in the preparation of 9,10-di-carboxy-phenanthrene anhydride from the 9,10-di-carboxy-9,10-di-hydro-phenanthrene anhydride. A substantial amount of 9,10-di-carboxy-phenanthrene anhydride is obtained by merely boiling an acetic anhydride solution of trans-9,10-di-carboxy-9,10-di-hydro-phenanthrene for several hours in the presence of air.

As is well known to those skilled in the art, the Friedel-Crafts synthesis may be successfully employed with a wide variety of conditions, and this holds true in the synthesis of the 9-aroyl-10-phenanthroic acids according to this invention. This is especially true with regard to the temperature, because the snythesis may be successfully completed over a wide temperature range.

The ring closure of the 9-benzoyl-10-phenanthroic acids to the corresponding 1,2,3,4-benz-anthraquinone may be carried out under a wide variety of conditions and with a wide variety of ring closing agents as will be apparent to those skilled in anthraquinone chemistry.

As many apparently widely different embodiments of this invention may be made without departing from the spirit and scope thereof, it is to be understood that we do not limit ourselves to the specific embodiments thereof except as defined in the appended claims.

We claim:
1. A compound having the formula:

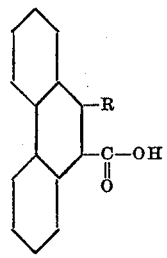

wherein R stands for an aroyl radical.

2. The process of preparing a 9-benzoyl-10-phenanthroic acid which comprises forming a phenanthrene alkali metal addition compound by treating phenanthrene with an alkali metal, forming the alkali metal salt of 9,10-di-carboxy-9,10-di-hydro-phenanthrene by treating the said phenanthrene alkali metal addition compound with carbon dioxide, forming 9,10-di-carboxy-9,10-di-hydro-phenanthrene by treating the said alkali metal salt of 9,10-di-carboxy-9,10-di-hydro-phenanthrene with acid, forming 9,10-di-carboxy-9,10-di-hydro - phenanthrene anhydride by treating the said 9,10-di-carboxy-9,10-di-hydro-phenanthrene with acetic anhydride, forming 9,10-di-carboxy-phenanthrene anhydride by treating the said 9,10-di-carboxy-9,10-di-hydro-phenanthrene anhydride with chromic anhydride, and forming a 9-benzoyl-10-phenanthroic acid by treating the said 9,10-di-carboxy-phenanthrene anhydride with a benzene in a Friedel-Crafts synthesis.

3. The compound having the formula:

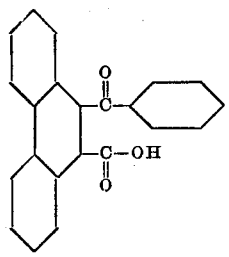

4 The process of preparing 9,(p)-toluyl-10-phenanthroic acid which comprises forming a phenanthrene alkali metal addition compound by treating phenanthrene with an alkali metal, forming the alkali metal salt of 9,10-di-carboxy-9,10-di-hydro-phenanthrene by treating the said phenanthrene alkali metal addition compound with carbon dioxide, forming 9,10-di-carboxy-9,10-di-hydro-phenanthrene by treating the said alkali metal salt of 9,10-di-carboxy-9,10-di-hydro-phenanthrene with acid, forming 9,10-di-carboxy-9,10-di-hydro-phenanthrene anhydride by treating the said 9,10-di-carboxy-9,10-di-hydro-phenanthrene with acetic anhydride, forming 9,10-di-carboxy-phenanthrene anhydride by treating the said 9,10-di-carboxy-9,10-di-hydro-phenanthrene anhydride with chromic anhydride, and forming a 9,(p)-toluyl-10-phenanthroic acid by treating the said 9,10-di-carboxy-phenanthrene anhydride with a toluene in a Friedel-Crafts synthesis.

5. The compound having the formula:

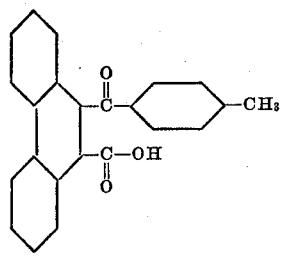

6. The process of preparing 9,(p)-chloro-benzoyl-10-phenanthroic acid which comprises forming a phenanthrene alkali metal addition compound by treating phenanthrene with an alkali metal, forming the alkali metal salt of 9,10-di-carboxy-9,10-di-hydro-phenanthrene by treating the said phenanthrene alkali metal addition compound with carbon dioxide, forming 9,10-di-carboxy-9,10-di-hydro-phenanthrene by treating the said alkali metal salt of 9,10-di-carboxy-9,10-di-hydro-phenanthrene with acid, forming 9,10-di-carboxy-9,10-di-hydro-phenanthrene anhydride by treating the said 9,10-di-carboxy-9,10-di-hydro-phenanthrene with acetic anhydride, forming 9,10-di-carboxy-phenanthrene anhydride by treating the said 9,10-di-carboxy-9,10 - di - hydro-phenanthrene anhydride with chromic anhydride, and forming a 9,(p)-chloro-benzoyl-10-phenanthroic acid by treating the said 9,10-di-carboxy-phenanthrene anhydride with chloro-benzene in a Friedel-Crafts synthesis.

7. The compound of the formula:

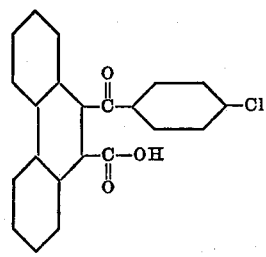

ROGER ADAMS.
ALLENE JEANES.